W. S. Gale,
Boiler Furnace Draft Regulator.
Nº 15,229. Patented July 1, 1856.

UNITED STATES PATENT OFFICE.

WILLIAM S. GALE, OF NEW YORK, N. Y.

IMPROVEMENT IN STEAM-PRESSURE REGULATORS.

Specification forming part of Letters Patent No. 15,229, dated July 1, 1856.

*To all whom it may concern:*

Be it known that I, WILLIAM S. GALE, of the city, county, and State of New York, have invented certain new and useful Improvements in Regulators for Controlling the Combustion of Fuel Used for Steam-Boilers by the Pressure of Steam in the Boiler; and I do hereby declare that the following is a full, clear, and exact description of the same, reference being had to the accompanying drawings, forming part of this specification, in which—

Figure 1:
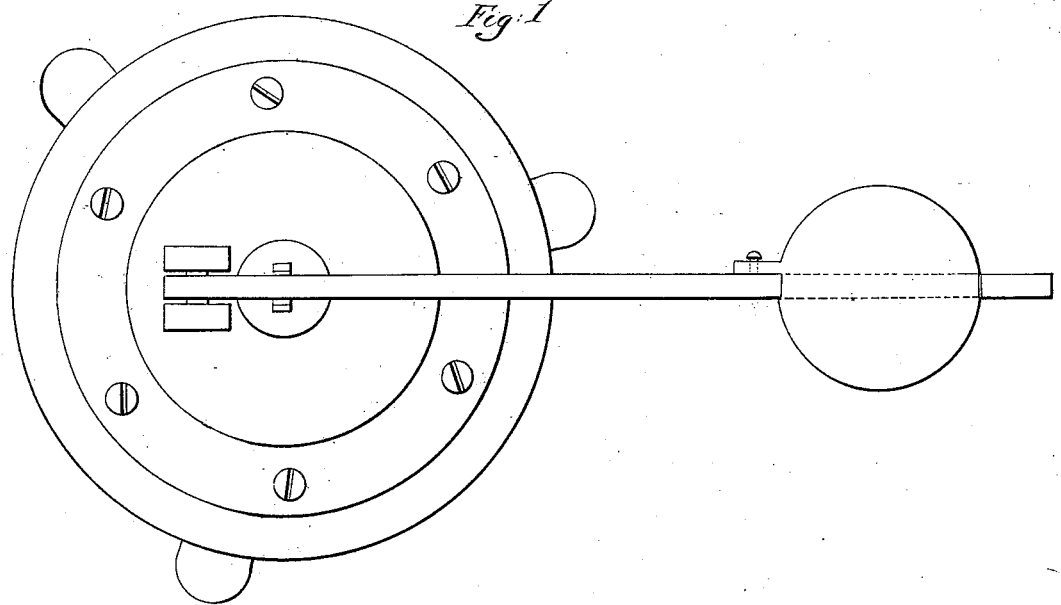
Figure 2:
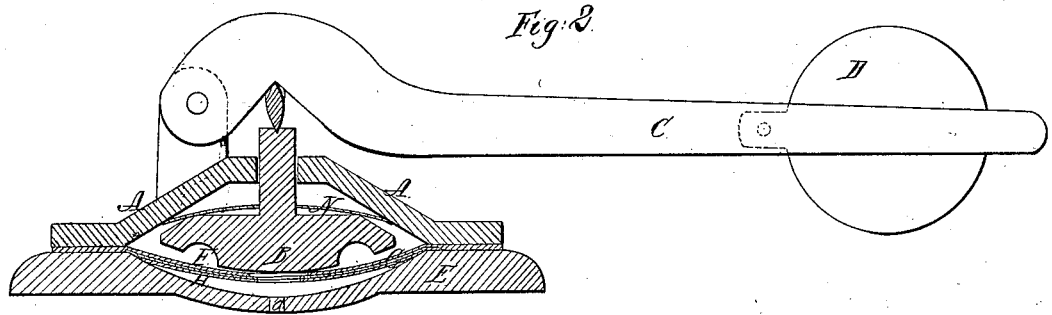

Figure 2 is a section of a regulator constructed according to my invention.

Similar letters of reference indicate corresponding parts of the same.

My invention consists in a certain mode of forming the bottom of the piston, which adapts itself to the gasket in such a manner that when the pressure is applied it allows of no escape of steam.

A in the drawings represents the cylinder, which is secured to the base E and receives steam at $a$ through a suitable pipe.

B is the piston; C, the weighted lever connected with the damper, and D the adjustable weight. The piston is made to fit the cylinder loosely, F being a groove in the bottom, which fills with air when the pressure is applied, thereby preventing any leak of steam.

G is a gasket clamped between the base E and the cylinder A, overhanging the groove F in the piston B, made of rubber or any other elastic substance to conform itself to the piston B as it moves up and down.

What I claim as my invention, and desire to secure by Letters Patent, is—

The arrangement of the groove F in the piston B in connection with the gasket G.

WILLIAM S. GALE.

Witnesses:
 WILLIAM NOYES,
 CHARLES E. BROWN.